(12) United States Patent
Ohsaka et al.

(10) Patent No.: US 8,070,924 B2
(45) Date of Patent: Dec. 6, 2011

(54) ELECTRODE FOR GENERATION OF HYDROGEN

(75) Inventors: Takeo Ohsaka, Yokohama (JP); Shunsuke Sata, Yokohama (JP); Miwako Nara, Fujisawa (JP); Yoshinori Nishiki, Fujisawa (JP)

(73) Assignee: Permelec Electrode Ltd., Kanagawa (JP)

( * ) Notice: Subject to any disclaimer, the term of this patent is extended or adjusted under 35 U.S.C. 154(b) by 638 days.

(21) Appl. No.: 12/053,652

(22) Filed: Mar. 24, 2008

(65) Prior Publication Data
US 2008/0230380 A1   Sep. 25, 2008

(30) Foreign Application Priority Data

Mar. 23, 2007   (JP) .................. 2007-077596

(51) Int. Cl.
*C25B 11/10* (2006.01)
*C25B 11/08* (2006.01)
*C25B 1/02* (2006.01)

(52) U.S. Cl. ......... 204/290.13; 204/290.12; 204/209.09; 204/290.08; 204/290.14; 204/290.01; 429/523; 429/524; 429/525; 429/526; 429/528; 429/532

(58) Field of Classification Search .............. 204/290.08, 204/290.09, 290.12, 290.13, 290.14; 205/638, 205/639; 429/523–526, 528, 532
See application file for complete search history.

(56) References Cited

U.S. PATENT DOCUMENTS

| 3,933,616 | A | * | 1/1976 | Beer ................. 204/290.12 |
| 4,146,446 | A | | 3/1979 | Von Sturm |
| 4,648,946 | A | | 3/1987 | Pellegri |
| 4,801,368 | A | | 1/1989 | Yamashita et al. |
| 6,312,571 | B1 | * | 11/2001 | Nara et al. ................. 204/252 |
| 6,936,370 | B1 | | 8/2005 | Knights et al. |

FOREIGN PATENT DOCUMENTS

| EP | 0298055 A1 | 1/1989 |
| JP | 7-90664 A | 4/1995 |
| JP | 2000-239882 A | 9/2000 |
| JP | 2003-268584 A | 9/2003 |
| JP | 2003-277966 A | 10/2003 |
| JP | 2003-277967 A | 10/2003 |
| JP | 2006-104502 A | 4/2006 |
| JP | 2006-110822 A | 4/2006 |
| JP | 2006-118023 A | 5/2006 |
| JP | 2006-193768 A | 7/2006 |
| JP | 2006-299395 A | 11/2006 |

OTHER PUBLICATIONS

Vielstich, Wolf et al. (Eds.): "Handbook of Fuel Cells: Fundamentals Technology and Applications" John Wiley & Sons Ltd., Chichester, GB; 2003, 24: 416-431.
V.S. Bagotzky, et al., "Adsorptive and Catalytic Properties of Platinum Microcrystals Deposited on Inert Supports", Electrochimica Acta, vol. 18, pp. 473-483 (1973), Pergamon Press, Great Britain.
D.V. Malevich, et al. "Hydrogen Sorption by the Platinum-Titanium-Oxide Electrodes", Russian Journal of Electrochemistry, vol. 32, No. 11, Dec. 1996, pp. 1298-1300, Interperiodica Publishing.

* cited by examiner

*Primary Examiner* — Bruce Bell
(74) *Attorney, Agent, or Firm* — Sughrue Mion, PLLC

(57) ABSTRACT

The present invention provides an electrode for generation of hydrogen comprising: a conductive substrate; a catalytic layer formed on the conductive substrate and containing at least one platinum group metal selected from the group consisting of Pt, Ir, Ru, Pd and Rh; and a hydrogen adsorption layer formed on the catalytic layer. The present invention also provides an electrode for generation of hydrogen comprising: a conductive substrate, a catalytic layer formed on the conductive substrate and containing: at least one platinum group metal selected from the group consisting of Pt, Ir, Ru, Pd and Rh and/or at least one oxide of said platinum group metals; and at least one metal selected from the group consisting of lanthanum series metals, valve metals, iron series metals and silver and/or at least one oxide of said metals; and a hydrogen adsorption layer formed on the catalytic layer.

5 Claims, 6 Drawing Sheets

HYDROGEN ADSORPTION-DESORPTION CURRENT POTENTIAL CHARACTERISTICS

HYDROGEN ADSORPTION-DESORPTION CURRENT POTENTIAL CHARACTERISTICS

HYDROGEN ADSORPTION-DESORPTION CURRENT POTENTIAL CHARACTERISTICS

HYDROGEN ADSORPTION-DESORPTION CURRENT POTENTIAL CHARACTERISTICS

HYDROGEN ADSORPTION-DESORPTION CURRENT POTENTIAL CHARACTERISTICS

CURRENT-POTENTIAL CURVES

ELECTRODE FOR GENERATION OF HYDROGEN

FIELD OF THE INVENTION

The present invention relates to an electrode for generation of hydrogen used in an electrochemical process, and particularly to an electrode for generation of hydrogen used in generation of hydrogen in alkaline or acidic aqueous solutions, industrial electrolysis such as pure water electrolysis using ion-exchange membranes, or used in processes of hydrogen absorbing materials and the like.

BACKGROUND OF THE INVENTION

Sodium hydroxide and chlorine which are important as industrial raw materials are mainly produced by brine electrolysis. This electrolytic process has shifted towards an ion-exchange membrane process using an ion-exchange membrane as a diaphragm and an active cathode having a low overvoltage, through a mercury process using a mercury cathode and a diaphragm process using an asbestos diaphragm and a soft iron cathode. This improvement decreased the electric power consumption rate for producing 1 ton of caustic soda to 2,000 kWh.

In the brine electrolysis using the active cathode, which has been most generally performed at present, the cathode is disposed in contact with or with a gap of 3 mm or less to a cathode side of the cation-exchange membrane. Water reacts at a catalytic layer to produce sodium hydroxide. An anodic reaction and a cathodic reaction are each as follows, and the theoretical decomposition voltage becomes 2.19 V.

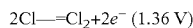

$$2Cl^- = Cl_2 + 2e^- \ (1.36 \text{ V})$$

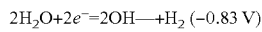

$$2H_2O + 2e^- = 2OH^- + H_2 \ (-0.83 \text{ V})$$

DSA used as an anode has been operationally proven up to 200-300 A/dm² in the mercury process. However, as the cathode in the ion-exchange process, it is important to have a low overvoltage, not to damage the membrane upon contact therewith and to provide less contamination due to metal ions and the like from the cathode. The proven active cathodes include an active electrode obtained by dispersing ruthenium powder in a Ni plating bath and performing composite plating using the resulting dispersion, a composite catalyst electrode comprising ruthenium oxide and nickel oxide, a Ni-plated electrode containing a second component such as S or Sn, a NiO plasma-sprayed electrode, a Raney nickel electrode, a Ni—Mo alloy electrode, a Pt—Ru immersion-plated electrode and an electrode using a hydrogen storage alloy for imparting resistance to reverse current. As reference documents, there are *Electrochemical Hydrogen Technologies*, pp. 15-62, 1990, U.S. Pat. No. 4,801,368, *J. Electrochem. Soc.* 137, 1419 (1993), *Modern Chlor-Alkali Technology*, vol. 3, 1986, and the like.

In recent ion-exchange membrane electrolysis technology, electrolysis cells which can increase the current density are being devised in order to increase production capacity and to decrease investment cost. Further, loading of high current has become possible by development of low-resistant membranes. In this case, it is desirable to dispose the cathode in close contact with (with a zero gap to) the ion-exchange membrane, because the voltage can be decreased. However, a conventional surface-roughened cathode is likely to mechanically damage the membrane, which has been a problem.

In order to solve this problem, cathodes using noble metals having high activity although having smooth surfaces have attracted attention. Such cathodes are disclosed in the following documents:

Patent Document 1: JP-A-2006-104502
Patent Document 2: JP-A-2006-193768
Patent Document 3: JP-A-2003-277966
Patent Document 4: JP-A-2003-277967
Patent Document 5: JP-A-2000-239882
Patent Document 6: JP-A-2006-299395
Patent Document 7: JP-A-2006-118022
Patent Document 8: JP-A-2006-118023
Patent Document 9: JP-A-2003-268584
Patent Document 10: JP-A-7-90664

The foregoing patent documents disclose the following, respectively:

Patent Document 1: A cathode for electrolysis comprising: a conductive substrate; an intermediate layer containing a conductive oxide; and a catalytic layer containing at least one member selected from silver and silver oxide, and at least one member selected from platinum group metals, platinum group metal oxides and platinum group metal hydroxides.

Patent Document 2: A cathode for generation of hydrogen comprising a cathode substrate and a catalytic layer formed thereon, wherein the catalytic layer contains cerium, platinum and ruthenium.

Patent Documents 3 and 4: A cathode for generation of hydrogen obtained by applying an aqueous solution containing a platinum group compound (preferably a ruthenium compound) and at least one member selected from lanthanum, cerium and yttrium compounds, onto a conductive substrate, followed by burning in the air to thermally decompose the aqueous solution, thereby forming a catalytic layer on the substrate.

Patent Document 5: A cathode improved in adhesion in which an intermediate layer containing a nickel oxide as a main component is provided between a substrate and a catalytic layer.

Patent Document 6: An electrode for generation of hydrogen comprising at least one member selected from the group consisting of platinum group compounds, lanthanum compounds, cerium compounds and yttrium compounds, niobium compounds and manganese compounds.

Patent Documents 7 and 8: An electrode for generation of hydrogen in which a platinum alloy comprising one metal selected from the group consisting of nickel, cobalt, copper, silver and iron and platinum is carried on a conductive substrate, and the amount of platinum contained in the platinum alloy is within the range of 0.40 to 0.99 in molar ratio.

Patent Document 9: A catalyst containing a ruthenium compound on a nickel substrate.

Patent Document 10: A low hydrogen overvoltage cathode obtained by performing electroplating in a nickel plating bath in which active carbon particles carrying a platinum group metal are dispersed to form an electrode active layer on an electrode substrate, the electrode active layer comprising nickel which contains the active carbon particles carrying the platinum group metal and has the particles adhered to a surface layer thereof.

There is a report that discharge of water (hydrogen ions) to hydrogen atoms proceeds on a main catalyst in an electrode for electrochemistry, a part of hydrogen atoms migrate to a hydrogen adsorption layer by spillover. For example, it is reported in non-patent document 1 that a spillover phenomenon of hydrogen occurs in Pt—C (a carbon substrate covered with platinum). Further, in non-patent document 2, it is reported that adsorption current of hydrogen increases in a Pt—TiO2 electrode.

However, there is no report that these materials have been utilized in order to generate hydrogen by hydrolysis of water. In other words, utilization of hydrogen adsorption for improving the hydrogen generation efficiency on a cathode for generation of hydrogen has not been known.

Non-Patent Document 1: *Electrochemica. Acta*, vol. 118, 473 (1973)

Non-Patent Document 2: *Russian J. Electrochem.*, vol. 132, 1298 (1996)

SUMMARY OF THE INVENTION

According to the techniques described in the respective patent documents, the use of the noble metals can substantially decrease the overvoltage of the conventional active cathodes. However, the price of the noble metals is extremely high, so that it has been necessary to decrease the amount thereof used to the minimum. Further, the catalysts are often deteriorated in performance due to deposition of impurities generated from electrolytes and cells, to thereby cause disadvantages of failing to exhibit sufficient performance, allowing the catalysts to drop off by hydrolysis or consuming the catalysts. Thus, practical problems have been left unsolved.

It is therefore an object of the invention to solve the above-mentioned background art problems and to provide a cathode for generation of activated hydrogen which can be used in an electrolytic cell at a large current density even with a zero gap and has an inexpensive noble metal catalyst.

The invention is an electrode for generation of hydrogen in which a hydrogen adsorption layer is formed, via or not via an intermediate layer, on a catalytic layer formed on a surface of a conductive substrate.

The above-mentioned catalytic layer comprises at least one platinum group metal selected from Pt, Ir, Ru, Pd and Rh and/or at least one compound of the platinum group metal. Alternatively, the catalytic layer comprises, in addition to the above-mentioned at least one platinum group metal/platinum group metal compound, at least one metal selected from lanthanum series metals, valve metals, iron series metals and silver and/or at least one oxide of these metals.

Preferably, the hydrogen adsorption layer comprises an oxide containing at least one element selected form Ta, Nb, Ti, Ni, Zr and lanthanum series metals or comprises carbon, and this hydrogen adsorption layer is formed so that the average formed amount thereof becomes 0.1 mmol/m$^2$ to 10 mmol/m$^2$ as elements.

The invention will be described in detail below.

In the invention, the hydrogen adsorption layer is formed on the surface of the catalytic layer.

In order to improve the activity of hydrogen gas generation of an electrode, the present inventors have made intensive studies. As a result, it has been found that the above-mentioned activity of hydrogen gas generation is substantially improved by forming a small amount of a layer having hydrogen adsorptivity on a conventional catalytic layer.

Only quite a small amount of this hydrogen adsorption layer is required compared to the catalytic layer, and the amount is adjusted such that an oxidation-reduction reaction of hydrogen ions and water in the catalytic layer is not hindered. For this reason, voids are present in the hydrogen adsorption layer therefor.

Although the reaction mechanism of the invention has not been completely elucidated, it is inferred to be caused by a spillover phenomenon, which is introduced in the following documents:

*Sekiyu Gakkaishi* (*Journal of the Japan Petroleum Institute*), 38, 291 (1995)

*Shokubai* (*Catalysis*), 45, 321 (2003)

Elsevier B. V., Spillover and Migration of Surface Species on Catalysts, 1997

Activation of hydrogen gas will be briefly described below as reference.

The migration phenomenon of hydrogen atoms and oxygen-containing groups on catalysts-carriers was discovered in the 1950s, and originally named, referring to flowing out of gas molecules to the carriers through metals on the carriers. Even now, this is an important technical element in development of catalysts in the petroleum refining industry.

Metals of groups 8 to 11 are excellent in capability of activating hydrogen molecules, and Pt and Pd are particularly excellent. However, a similar effect is known not only in the metals, but also in oxides or sulfides thereof. As a receptor for hydrogen (a synonym for a hydrogen adsorption material), a similar phenomenon has also been confirmed, for example, in alumina ($Al_2O_3$), silica ($SiO_2$), zeolite, active carbon, $MoO_3$, $V_2O_5$, $Fe_2O_3$, $TiO_2$, $WO_3$, a heteropoly acid or an organic polymer as a catalyst carrier.

In these composite catalysts, a dehydrogenation reaction, hydrogenation, isomerization and heterogeneous decomposition are accelerated compared to in single catalysts. Further, an effect of accelerating a desorption reaction of hydrogen gas from a hydrocarbon compound is also reported (a reverse spillover phenomenon).

Taking the catalyst as X and the hydrogen adsorption layer as M, the mechanism of hydrogen gas generation of the invention can be explained by the following equations. First, in an acidic region and an alkaline region, hydrogen is generated as follows:

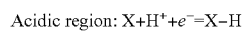

Acidic region: $X+H^++e^-=X-H$

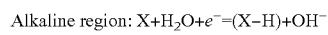

Alkaline region: $X+H_2O+e^-=(X-H)+OH^-$

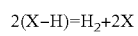

$2(X-H)=H_2+2X$

When the hydrogen adsorption layer is present, hydrogen adsorbed by the catalytic layer partially migrates (spills over) to the hydrogen adsorption layer, and is desorbed as hydrogen gas in the following manner:

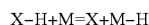

$X-H+M=X+M-H$

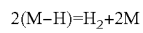

$2(M-H)=H_2+2M$

The generation of hydrogen is more accelerated by forming the hydrogen adsorption layer on the surface of the catalytic layer as described above.

The electrode for generation of hydrogen of the invention is mainly used as a cathode for generation of hydrogen. However, in addition to this, the electrode can also be used as a material for forming hydrogen atoms from hydrogen ions, and for adsorbing or desorbing the hydrogen atoms.

In the electrode for generation of hydrogen of the invention containing a noble metal as a main catalytic component, a small amount of the hydrogen adsorption layer is formed on the catalytic layer in the present invention, thereby substantially improving electrode activity (decreasing the overvoltage), making it possible to decrease the amount of the catalyst even at a large current density and to exhibit equivalent activity even when a small amount of the catalyst is used. The electrode of the invention decreases the loss of the catalyst, has industrial values such as prevention of catalyst poisoning caused by impurity components in an electrolyte and no damage of a membrane upon contact with the membrane, and can decrease investment and electric power costs.

DETAILED DESCRIPTION OF THE INVENTION

Figure 1:
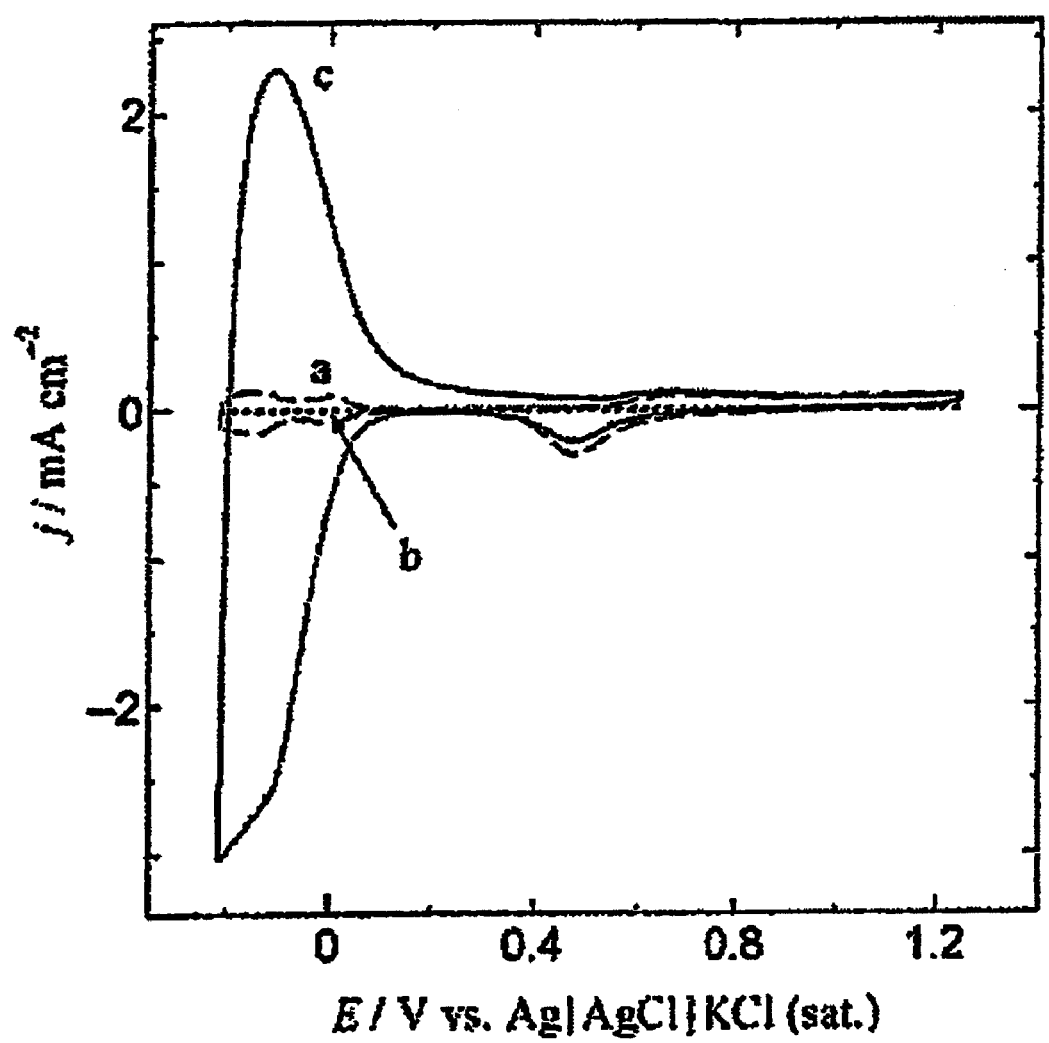
FIG. 1 is a graph showing hydrogen adsorption waves and desorption current-potential characteristics on the cathodes of Reference Example 1 and Comparative Example 1.

Respective elements of the electrode for generation of hydrogen of the invention will be described in detail below.

Substrate

As the electrode substrate, a stainless steal, titanium, nickel or carbon-based material is preferred in terms of conductivity and chemical stability. The thickness thereof is preferably from 0.05 to 5 mm, and the porosity is preferably from 10 to 95%.

It is preferred to perform surface roughening treatment in order to increase adhesion force of the catalytic layer. Methods thereof include conventional blast treatment in which a powder is sprayed, etching using a soluble acid, plasma spray coating and the like. In order to remove contaminating particles such as metals and organic matter on a surface thereof, chemical etching treatment is performed. In the case of nickel which is a typical substrate metal, the consumption amount thereof is preferably about from 5 to 500 $g/m^2$.

Intermediate Layer

In the invention, the intermediate layer of an oxide may be formed on a surface of the above-mentioned conductive substrate before the catalytic layer is formed.

As for a method for forming the intermediate layer, even mere heat treatment of the conductive substrate allows oxygen in the air to react with nickel of the substrate to form $Ni_{(1-x)}O$. The oxide generally has p-type semiconductivity because of its oxygen defects, although it depends on its manufacturing conditions. The heat treatment temperature is from 350 to 550° C., and the burning time is preferably from 5 to 60 minutes. When the thickness of the oxide is too thick, the resistance loss increases. On the other hand, when it is thin, only an uneven surface layer is obtained. The optimum thickness is about from 0.1 to 100 μm, and it is preferred that the intermediate layer is uniformly formed on the surface so that the metal of the substrate does not come into contact with an alkaline aqueous solution as an electrolyte.

It is possible to stably obtain the oxide by applying a nickel ion-containing solution and similarly performing heat treatment. Such a solution composition that corrodes the substrate is preferred. As a raw material for nickel, there is nickel nitrate, nickel sulfate or the like. This is added to nitric acid or sulfuric acid, and an aqueous solution is prepared by adjusting it to an appropriate concentration. This aqueous solution can be utilized as the coating solution. After drying, pyrolysis is performed.

Even when the substrate is nickel, it can also be coated with a conductive oxide intermediate layer composed of other component(s). For example, there can be used a compound stable in alkali and having negligible capability of hydrogen generation as compared to that of the catalyst on the surface, such as n-type titanium oxide ($TiO_{2-x}$).

Catalytic Layer

The catalytic layer contains at least one metal selected from Pt, Ir, Ru, Pd and Rh or at least one compound thereof, and is formed on the above-mentioned conductive substrate. Specific examples thereof include Pt, Ru—Pt, Ru oxide and the like.

Alternatively, the catalytic layer may contain: at least one platinum group metal selected from the group consisting of Pt, Ir, Ru, Pd and Rh and/or at least one oxide of these platinum group metals; and at least one metal selected from the group consisting of lanthanum series metals, valve metals, iron series metals and silver and/or at least one oxide of these metals. Specific examples thereof include Pt—Ag, Pd—Ag, Ru—Ni oxide, Pt—Ce oxide, Ru—Ce oxide, Pt—La oxide, Ru—La oxide and the like.

Catalyst Forming Method

It is preferred that the catalytic layer is formed by applying a solution of a salt of the catalyst metal onto the surface of the substrate, followed by burning, similarly to anode (DSE) widely used in brine electrolysis.

Drying after burning is performed at 40 to 150° C. for 5 to 20 minutes, followed by pyrolysis. The pyrolysis temperature is from 200 to 550° C., and the burning time is preferably from 5 to 60 minutes.

Instead of burning, the catalytic layer may be formed by preparing a corresponding salt solution, and performing electroplating or nonelectrolytic plating using a reducing agent. When ruthenium is used as a raw material for the catalytic layer, ruthenium, ruthenium oxide, ruthenium chloride, ruthenium nitrate, ruthenium acetate, ruthenium alkoxide or the like is used as the salt. This is added to nitric acid, hydrochloric acid or water, and dissolved therein to prepare an aqueous solution having an appropriate concentration, which can be utilized as the coating solution. In the case of platinum, chloroplatinic acid, dinitrodiamine platinum salt or the like is used. This is added to nitric acid, hydrochloric acid or water, and dissolved therein to prepare an aqueous solution having an appropriate concentration, which can be utilized as the coating solution. For iridium, palladium and rhodium, similar raw materials can be utilized. The best total catalyst amount is about from 1 to 15 $g/m^2$, and the optimum thickness is about from 0.1 to 10 μm.

Hydrogen Adsorption Layer

Although the hydrogen adsorption layer can be composed of any material having hydrogen adsorptivity, it is preferred to use an oxide containing at least one element selected from Ta, Nb, Ti, Ni, Zr and lanthanide metals (such as Ce). Alternatively, carbon can be suitably used.

The average formed amount of the hydrogen adsorption layer is preferably from 0.1 $mmol/m^2$ to 10 $mmol/m^2$ as elements. Exceeding 10 $mmol/m^2$ results in obstruction to a progress of electrolysis, whereas less than 0.1 $mmol/m^2$ results in a decrease in the specific effect of enhancing hydrogen adsorption by the hydrogen adsorption layer.

Production Method of Hydrogen Adsorption Layer

It is suitable that the hydrogen adsorption layer is produced by pyrolysis. However, it is also possible to produce the hydrogen adsorption layer by applying or pressing a powdery raw material comprising the above-mentioned element onto a surface of the catalyst, via a proper resin to fix it. Further, it is also possible to use any one of six kinds of forming techniques shown below, and it is also possible to combine two or more of these techniques.

When a metal oxide is formed using these techniques, directly or by firstly forming a metal layer, followed by burning in an oxygen atmosphere of 400 to 800° C. to form an oxide, the metal oxide partially drops off to obtain an electrode for generation of hydrogen in which the base catalytic layer is exposed.

A carbon layer can be formed by a similar technique.

(Hot Dipping)

This is a method of dipping a substrate in a molten metal to allow the molten metal to adhere to a surface of the substrate. Current is allowed to flow in the course of the adhesion as needed.

In the case of Ta, for example, $K_2TaF_7$ is added to a molten salt of LiF—NaF (60:40 by mol %), and maintained at 800° C. under an Ar atmosphere in an electric furnace. Current is allowed to flow, thereby forming a Ta layer, and then, burning is performed in an oxygen atmosphere of 400 to 800° C. to obtain the electrode for generation of hydrogen composed of $Ta_2O_5$.

(Chemical Vapor Deposition Method)

This is a film-forming technique called CVD and widely used in the semiconductor manufacturing process, and a method of depositing a desired metal or metal compound by a pyrolysis reaction, a hydrogen reduction reaction, a high-temperature disproportionation reaction or the like in contact of a metal salt vaporized at low temperature with a solid heated at high temperature. For example, when the hydrogen reduction reaction of an inorganic salt is utilized, Nb is deposited while repeating the formation of low-order $Nb_3Cl_8$ from $NbCl_5$ by hydrogen and the decomposition thereof by the high-temperature disproportionation reaction. On the other hand, Ta is directly reduced from $TaCl_5$ by hydrogen.

(Physical Vapor Deposition Method)

This is called PVD, and includes vacuum vapor deposition, sputtering, ion plating and the like. Existing commercial equipment can be used. A desired thin film can be obtained by controlling the degree of vacuum, the substrate temperature, the target composition and the electric power.

(Vacuum Vapor Deposition Method)

This is one embodiment of the physical vapor deposition method, and a metal to be deposited is heated in a space under reduced pressure to adhere it to a surface of a substrate. The pressure is usually controlled in the range of $10^{-1}$ to $10^{-2}$ Pa.

(Sputtering)

This is another embodiment of the physical vapor deposition method, and has features of being able to obtain a film of a high-melting material at low temperature, being able to form a uniform film over a large area, being able to comply with the alloy composition, and having fast responsibility to be easily controllable, compared to the vacuum vapor deposition. Accordingly, this has become popular. Usually, a rare gas such as Ar is glow discharged under a vacuum of about $10^{-0}$ to $10^{-2}$ Pa, and ions obtained are accelerated in an electric field to collide against a target metal, thereby adhering atoms of the target metal to an object substrate. As described above, the control is made in the range of $10^{-0}$ to $10^{-2}$ Pa. Direct current spattering, high frequency sputtering, magnetron sputtering and ion beam sputtering generating no plasma are also known.

(Ion Plating)

This is still another embodiment of the physical vapor deposition method, and a method of accelerating in an electric field metal ions plasmanized under a state of discharge in a gas reduced in pressure to deposit the metal ions on a negatively polarized substrate. It is possible to obtain a film having better quality in terms of high aspect ratio and uniformity than the sputtering.

Electrochemical Cell

When the electrode of the invention is used in brine electrolysis, a fluororesin-based membrane is most suitable as an ion-exchange membrane in terms of corrosion resistance. An anode is an insoluble titanium-made electrode having a noble metal oxide called DSE or DSA, and is preferably porous so that it can be used in close contact with the membrane.

When the cathode of the invention and the membrane are required to be brought into close contact with each other, it is sufficient only to previously mechanically bond them or to give pressure to them at the time of electrolysis. The pressure is preferably from 0.1 to 30 $kgf/cm^2$. As electrolytic conditions, the temperature is preferably from 60 to 95° C., and the current density is preferably from 10 to 100 $A/dm^2$.

The electrode of the invention also has utility value as a cathode in alkaline water electrolysis or pure water electrolysis using an ion-exchange membrane, and as an anode for a fuel cell. These electrolytic conditions are described in *Electrochemical Hydrogen Technologies*, pp. 15-62, 1990.

The present invention will be illustrated in greater detail with reference to the following examples relating to the production, use and the like of the electrode for generation of hydrogen according to the invention, but the invention should not be construed as being limited thereto.

Reference Examples 1

K2Ta2F7 was added to a molten salt of LiF—NaF (60:40 by mol %), and maintained at 800° C. under an Ar atmosphere in an electric furnace. Current was allowed to flow at a current density of 8 $A/dm^2$ for 10 minutes, thereby forming a Ta layer on a platinum plate immersed in this molten salt. This was burnt at 600° C. in the air to obtain an oxide. Ta oxide partially dropped off to cause base platinum to be exposed. The formation of $Ta_2O_5$ was confirmed by XRD.

Comparative Example 1

The platinum plate before immersion in the molten salt used in Reference Example 1 was evaluated as a comparison.

Example 1

As a cathode substrate, there was used a platinum plate (width: 2 cm, height: 3 cm) the surface of which was sufficiently roughened with alumina particles (No. 60) and etched with 20 wt % boiled hydrochloric acid.

The nickel plate was immersed in a 2% aqueous solution of hydrochloric acid containing chloroplatinic acid, and taken out after 5 minutes. After drying at 60° C., this was burnt at 500° C. for 10 minutes in an electric furnace. This process was repeatedly conducted three times to prepare a catalytic layer with a Pt film having a final total catalyst amount of 3 $g/m^2$.

A solution in which 5 wt % of tantalum chloride was dissolved was prepared. A mesh on which the above-mentioned catalytic layer was formed was immersed therein, and slowly pulled up. After drying at 60° C., this was burnt at 500° C. for 10 minutes in an electric furnace. This process was repeatedly conducted twice to prepare a cathode for generation of hydrogen with a hydrogen adsorption layer having a final $Ta_2O_5$ catalyst amount of 0.6 g/m².

Example 2

A Pt electrode (a mesh on which a catalyst was formed) was prepared in the same manner as in Example 1. A solution in which 5 wt % of titanium chloride was dissolved was prepared. The above-mentioned Pt electrode was immersed therein, and slowly pulled up. After drying at 60° C., this was burnt at 500° C. for 10 minutes in an electric furnace. This process was repeatedly conducted twice to prepare a cathode for generation of hydrogen with a hydrogen adsorption layer having a final $TiO_2$ catalyst amount of 0.3 g/m².

Example 3

A Pt electrode (a mesh on which a catalyst was formed) was prepared in the same manner as in Example 1. A solution in which 5 wt % of cerium nitrate was dissolved was prepared. The above-mentioned mesh on which the catalyst was formed was immersed therein, and slowly pulled up. After drying at 60° C., this was burnt at 500° C. for 10 minutes in an electric furnace. This process was repeatedly conducted twice to prepare a cathode for generation of hydrogen with a hydrogen adsorption layer having a final $CeO_2$ catalyst amount of 0.5 g/m².

Example 4

A Pt electrode (a mesh on which a catalyst was formed) was prepared in the same manner as in Example 1. A solution in which 5 wt % of nickel chloride was dissolved was prepared. The above-mentioned mesh on which the catalyst was formed was immersed therein, and slowly pulled up. After drying at 60° C., this was burnt at 500° C. for 10 minutes in an electric furnace. This process was repeatedly conducted twice to prepare a cathode for generation of hydrogen with a hydrogen adsorption layer having a final NiO catalyst amount of 0.2 g/m².

Comparative Example 2

An active cathode having only a Pt film formed in the same manner as in Example 1 was prepared.

Example 5

The nickel plate of Example 1 was immersed in a 2% aqueous solution of hydrochloric acid containing Pt and Ru (molar ratio: 1:1), and taken out after 5 minutes to prepare an active cathode having a Pt—Ru metal film. A $Ta_2O_5$ layer was formed thereon in the same manner as in Example 1.

Comparative Example 3

An active cathode having only a Pt—Ru metal film formed in the same manner as in Example 5 was prepared.

Example 6

Using cerium nitrate and dinitrodiamine platinum salt as raw materials, a coating solution having a composition concentration of 5 wt % was prepared. The nickel plate of Example 1 was immersed in the above-mentioned coating solution, and taken out after 5 minutes. After drying at 60° C., this was burnt at 500° C. for 10 minutes in an electric furnace. This process was repeatedly conducted three times. As a result, the final total catalyst amount was 3 g/m².

An aqueous solution in which 5 wt % of tantalum chloride was dissolved was prepared. The above-mentioned mesh on which the catalyst was formed was immersed therein, and slowly pulled up. After drying at 60° C., this was burnt at 500° C. for 10 minutes in an electric furnace. This process was repeatedly conducted twice to prepare a cathode for generation of hydrogen with a hydrogen adsorption layer having a final $Ta_2O_5$ catalyst amount of 0.6 g/m².

Comparative Example 4

An active cathode having only a Pt—Ce oxide film formed in the same manner as in Example 6 was prepared.

Example 7

Using lanthanum nitrate and dinitrodiamine platinum salt as raw materials, a coating solution having a composition concentration of 5 wt % was prepared. The nickel plate of Example 1 was immersed in the above-mentioned coating solution, and taken out after 5 minutes. After drying at 60° C., this was burnt at 500° C. for 10 minutes in an electric furnace. This process was repeatedly conducted three times. As a result, the final total catalyst amount was 3 g/m².

An aqueous solution in which 5 wt % of tantalum chloride was dissolved was prepared. The above-mentioned mesh on which the catalyst was formed was immersed therein, and slowly pulled up. After drying at 60° C., this was burnt at 500° C. for 10 minutes in an electric furnace. This process was repeatedly conducted twice to prepare a cathode for generation of hydrogen with a hydrogen adsorption layer having a final $Ta_2O_5$ catalyst amount of 0.6 g/m².

Comparative Example 5

An active cathode having only a Pt—La oxide film formed in the same manner as in Example 6 was prepared.

Comparison of Examples, Comparative Examples and Reference Example

For the respective cathodes obtained in Examples, Comparative Examples and Reference Example, comparison of adsorption characteristics was performed. The results thereof are shown in the accompanying drawings.

FIG. 1 shows the hydrogen adsorption waves and desorption currents obtained by a potential sweep method in 50 mM sulfuric acid at room temperature, for Reference Example 1 and Comparative Example 1. The adsorption currents (about 0.5 V at a Ag/AgCl reference electrode) of those oxygen-containing species were equivalent to each other. However, there was an about 10-fold increase in the hydrogen adsorption and desorption current (about −0.1 V), and the spillover of hydrogen atoms was observed. For reference, the characteristic of a Ta plate is also shown in FIG. 1.

Figure 2:
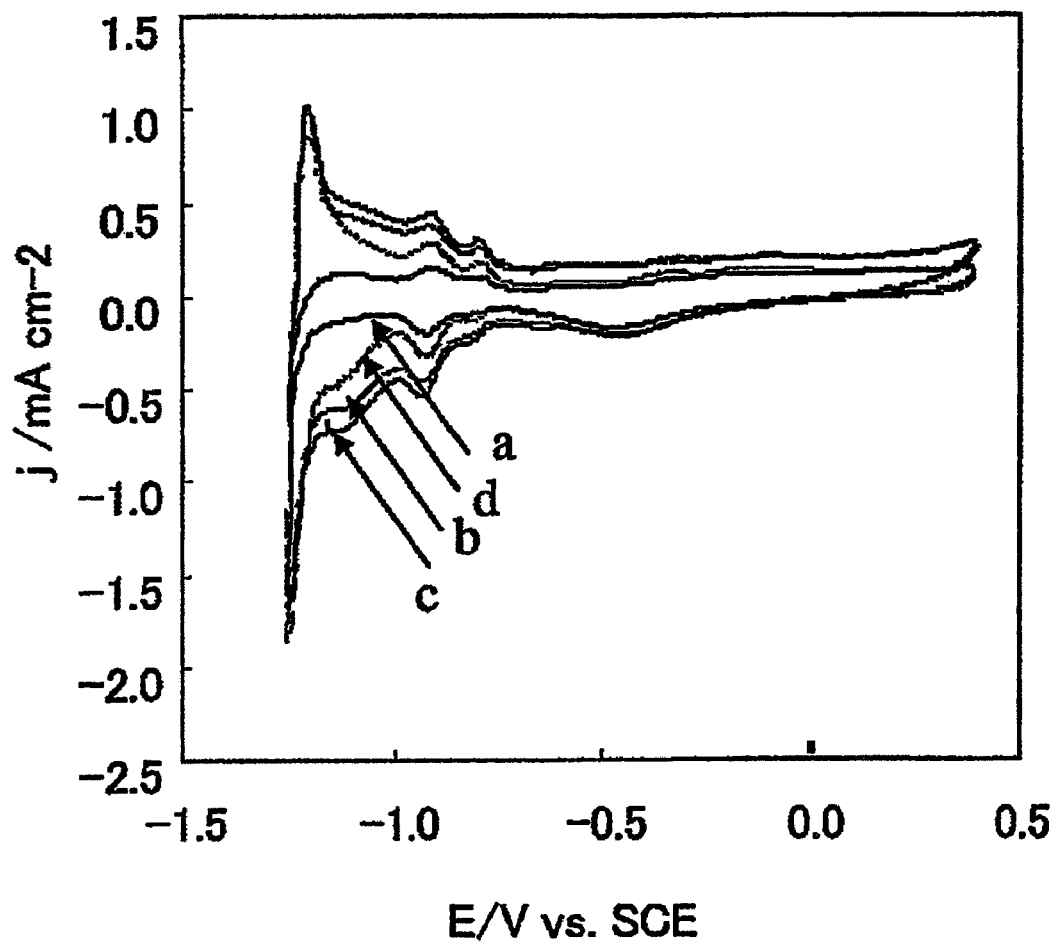
FIG. 2 is a graph showing hydrogen adsorption waves and desorption current-potential characteristics of Examples 1 to 3 and Comparative Example 2.

FIG. 2 shows similar results obtained in a 32 wt % NaOH solution at 100 mV/sec at room temperature, for Examples 1 to 3 and Comparative Example 2. Higher hydrogen adsorption and desorption current were observed in all Examples than in Comparative Example.

Figure 3:
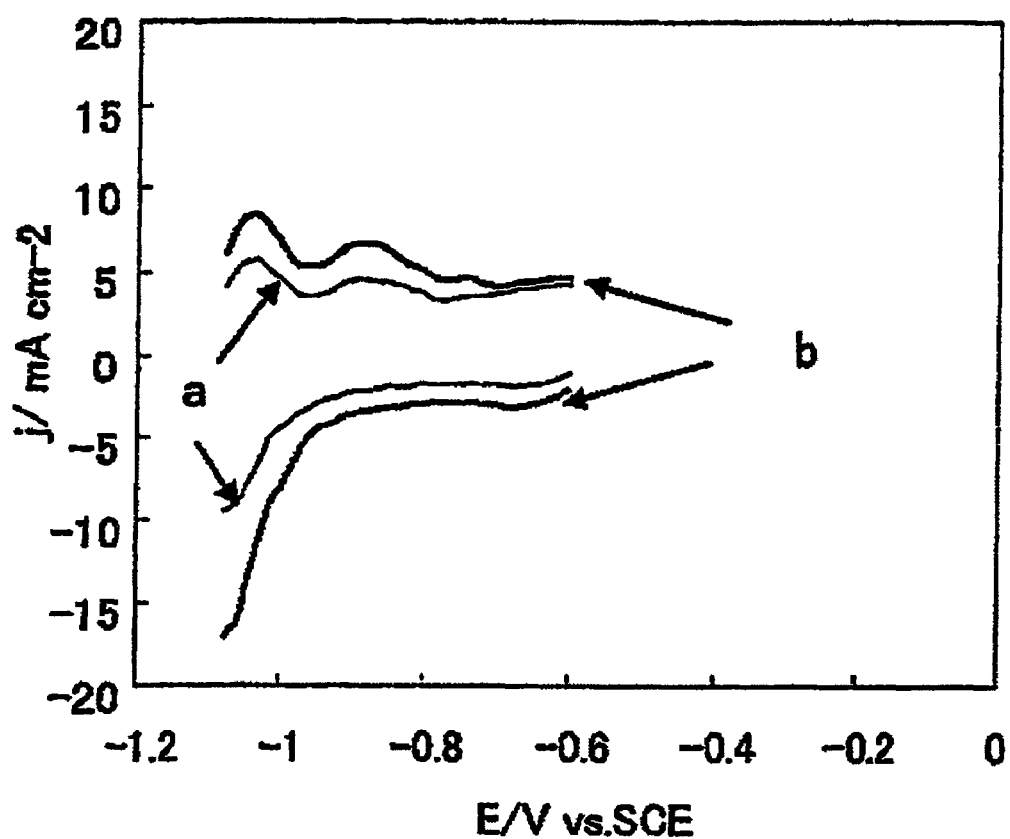
FIG. 3 is a graph showing hydrogen adsorption waves and desorption current-potential characteristics of Example 5 and Comparative Example 3.

FIG. 3 shows the results obtained by a potential sweep method in a 32 wt % NaOH solution at room temperature, for Example 5 and Comparative Example 3. Higher hydrogen adsorption and desorption current were observed in Example than in Comparative Example.

Figure 4:
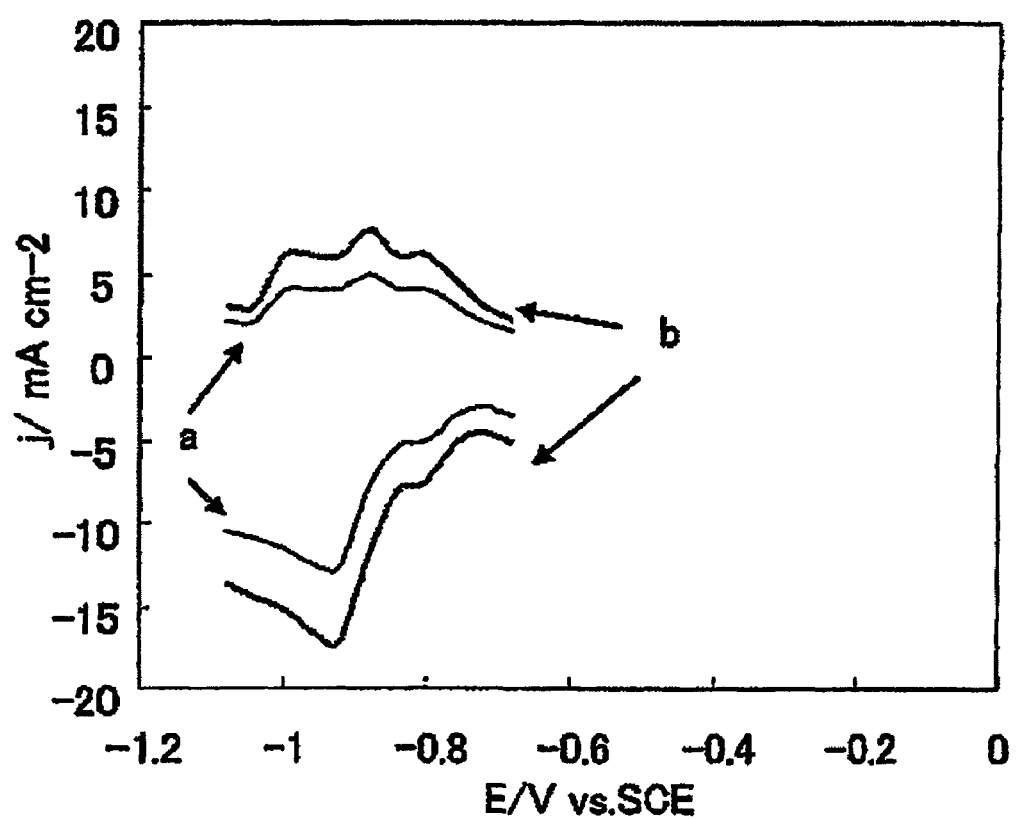
FIG. 4 is a graph showing hydrogen adsorption waves and desorption current-potential characteristics of Example 6 and Comparative Example 4.

FIG. 4 shows the results obtained by a potential sweep method in a 32 wt % NaOH solution at room temperature, for Example 6 and Comparative Example 4. Higher hydrogen adsorption and desorption current were observed in Example than in Comparative Example.

Figure 5:
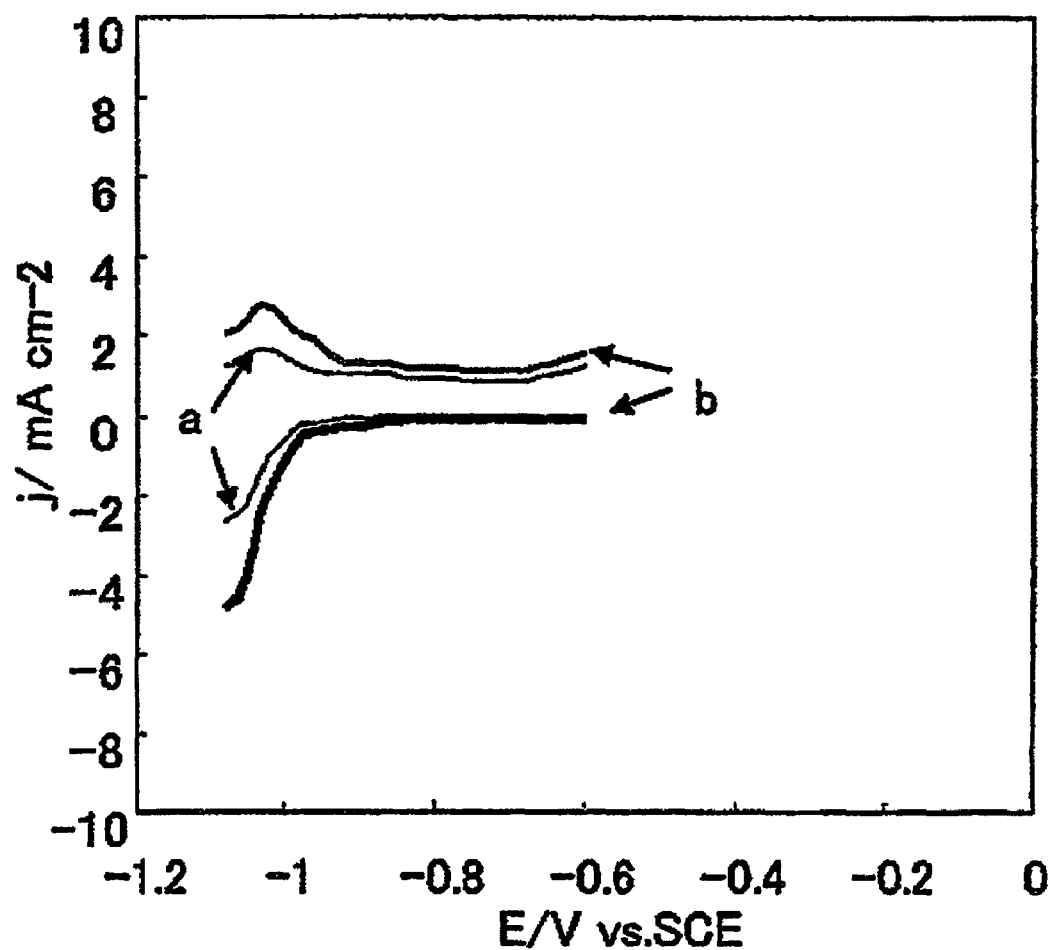
FIG. 5 is a graph showing hydrogen adsorption waves and desorption current-potential characteristics of Example 7 and Comparative Example 5.

FIG. 5 shows the results obtained by a potential sweep method in a 32 wt % NaOH solution at room temperature, for Example 7 and Comparative Example 5. Higher hydrogen adsorption and desorption current were observed in Example than in Comparative Example.

Figure 6:
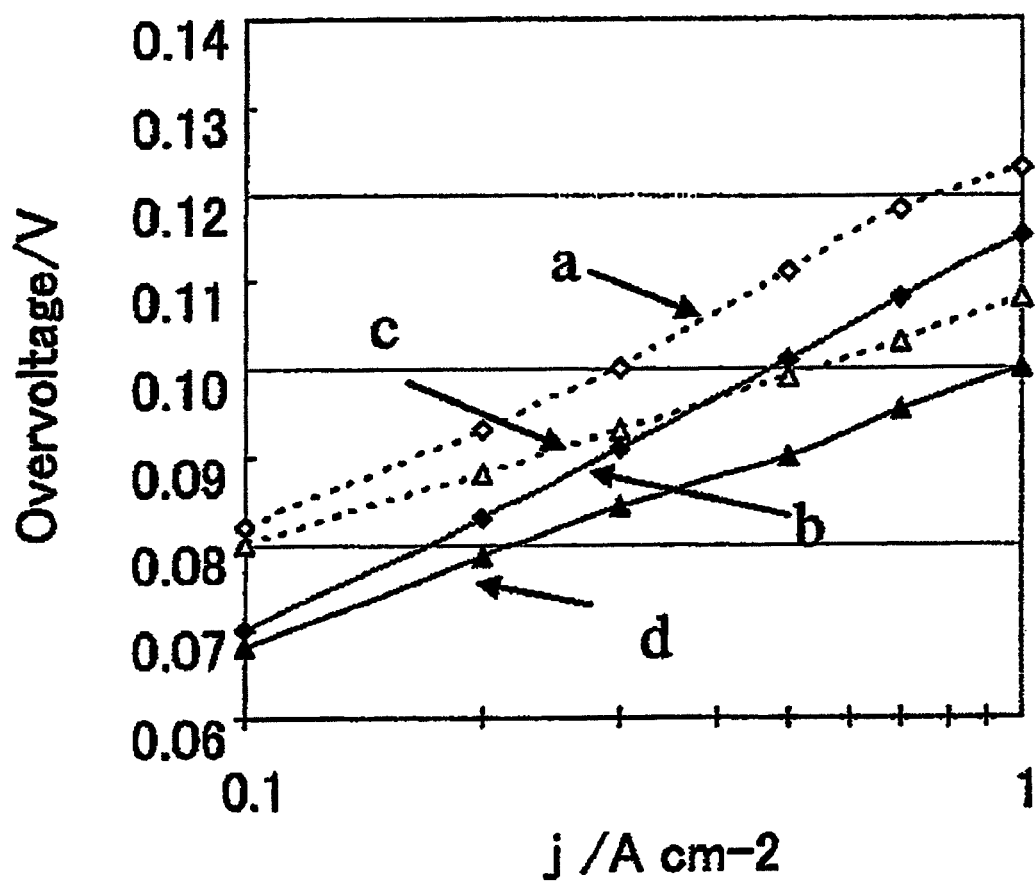
FIG. 6 is a graph showing the desorption current-potential relationship of hydrogen generation in Examples 2 and 6 and Comparative Examples 2 and 4.

FIG. 6 shows the current-potential relationship of hydrogen generation in a 32 wt % NaOH solution at room temperature, for Examples 2 and 6 and Comparative Examples 2 and 4. Lower hydrogen generation potentials were observed in Examples.

Example 8

A cell having an electrolysis area of 100 cm² (width: 5 cm, height: 20 cm) was used. As a cathode substrate, there was used a Ni mesh (8 mm-long width×6 mm-short width×1 mm-thickness) the surface of which was sufficiently roughened with alumina particles (No. 60) and etched with 20 wt % boiled hydrochloric acid. The mesh was placed in an air-atmosphere burning furnace of 500° C. for 20 minutes to form a Ni oxide on the surface thereof. Using cerium nitrate and dinitrodiamine platinum salt as raw materials, a coating solution having a composition concentration of 5 wt % was prepared. The above-mentioned nickel mesh was immersed in the coating solution, and slowly pulled up. After drying at 60° C., this was burnt at 500° C. for 10 minutes in an electric furnace. This process was repeatedly conducted three times. As a result, the final total catalyst amount was 3 g/m².

An aqueous solution in which 5 wt % of tantalum chloride was dissolved was prepared. The above-mentioned mesh on which the catalyst was formed was immersed therein, and slowly pulled up. After drying at 60° C., this was burnt at 500° C. for 10 minutes in an electric furnace. This process was repeatedly conducted twice to prepare a cathode for generation of hydrogen with a hydrogen adsorption layer having a final $Ta_2O_5$ catalyst amount of 0.9 g/m².

Using a DSE porous anode made of titanium as an anode and Nafion 981 (manufactured by E.I. du Pont de Nemours & Co.) as an ion-exchange membrane, an electrolysis cell was prepared to have a structure in which the electrodes and the porous current feeders were brought into close contact with both sides of the ion-exchange membrane. A saturated brine solution was supplied as an anode solution at a rate of 4 ml per minute, and pure water was supplied to the cathode at a rate of 0.4 ml per minute. The temperature was adjusted to 90° C., and a current of 50 A was allowed to flow. As a result, the cathode overvoltage was 75 mV. After electrolysis for 10 days performed while interrupting the hydrolysis for 1 hour daily, the current efficiency was 96% with no decrease, and no increase in the cathode overvoltage was observed. After disintegration of the cell, the electrode was analyzed, but no deposit was observed. The consumption of the catalyst was 1% or less.

Comparative Example 6

An electrode was prepared in the same manner as in Example 8 except that the Ta film was not formed. For this electrode, a similar evaluation was made. As a result, the cathode overvoltage was 85 mV, and the efficiency decreased to 94%. An increase in the cathode overvoltage was 10 mV. After disintegration of the cell, the electrode was analyzed. As a result, adhesion of iron was confirmed. The consumption of the catalyst was 5%.

Example 9

Using an electrode obtained by adhering 0.05 g/m² of carbon to only a surface of the catalytic layer by PVD in place of forming the hydrogen adsorption layer of Ta in Example 8, a similar evaluation was made. As a result, the cathode overvoltage was 80 mV. The current efficiency was 96% with no decrease, and no increase in the cathode overvoltage was observed. After disintegration of the cell, the electrode was analyzed, but no deposit was observed. The consumption of the catalyst was 2% or less.

The present invention has been described in detail and with reference to specific embodiments thereof, it will be apparent to one skilled in the art that various changes and modifications can be made therein without departing from the spirit and scope thereof.

This application is based on Japanese Patent Application No. 2007-077596 filed Mar. 23, 2007, and the contents thereof are herein incorporated by reference.

What is claimed is:

1. An electrode for generation of hydrogen comprising:
   a conductive substrate;
   a catalytic layer formed on the conductive substrate and containing at least one platinum group metal selected from the group consisting of Pt, Ir, Ru, Pd and Rh; and
   a hydrogen adsorption layer formed on the catalytic layer, wherein the hydrogen adsorption layer has an average formed amount of from 0.1 mmol/m² to 10 mmol/m² in terms of element.

2. An electrode for generation of hydrogen comprising:
   a conductive substrate,
   a catalytic layer formed on the conductive substrate and containing:
   at least one platinum group metal selected from the group consisting of Pt, Ir, Ru, Pd and Rh and/or at least one oxide of said platinum group metals; and
   at least one metal selected from the group consisting of lanthanum series metals, valve metals, iron series metals and silver and/or at least one oxide of said metals; and
   a hydrogen adsorption layer formed on the catalytic layer, wherein the hydrogen adsorption layer has an average formed amount of from 0.1 mmol/m² to 10 mmol/m² in terms of element.

3. The electrode for generation of hydrogen according to claim 1 or 2, wherein the hydrogen adsorption layer comprises an oxide containing at least one element selected form the group consisting of Ta, Nb, Ti, Ni, Zr and lanthanum series metals.

4. The electrode for generation of hydrogen according to claim 1 or 2, wherein the hydrogen adsorption layer comprises a layer consisting of carbon.

5. The electrode for generation of hydrogen according to claim 1 or 2, further comprising an intermediate layer formed between the conductive substrate and the catalytic layer.

* * * * *